US008943005B2

(12) United States Patent
Shibata

(10) Patent No.: US 8,943,005 B2
(45) Date of Patent: Jan. 27, 2015

(54) METRIC LEARNING APPARATUS

(75) Inventor: Tomoyuki Shibata, Tokyo (JP)

(73) Assignee: Kabushiki Kaisha Toshiba, Tokyo (JP)

(\*) Notice: Subject to any disclaimer, the term of this patent is extended or adjusted under 35 U.S.C. 154(b) by 365 days.

(21) Appl. No.: 13/505,514

(22) PCT Filed: Nov. 12, 2009

(86) PCT No.: PCT/JP2009/006053
§ 371 (c)(1),
(2), (4) Date: Jul. 23, 2012

(87) PCT Pub. No.: WO2011/058605
PCT Pub. Date: May 19, 2011

(65) Prior Publication Data
US 2012/0284215 A1    Nov. 8, 2012

(51) Int. Cl.
*G06F 15/18* (2006.01)
*G06F 7/60* (2006.01)
*G06N 99/00* (2010.01)
*G06K 9/62* (2006.01)

(52) U.S. Cl.
CPC ............ *G06N 99/005* (2013.01); *G06K 9/6276* (2013.01); *G06K 9/6285* (2013.01); *G06K 9/6223* (2013.01)
USPC ................................................. 706/12; 703/2

(58) Field of Classification Search
None
See application file for complete search history.

(56) References Cited

U.S. PATENT DOCUMENTS

| 2002/0143761 A1 | 10/2002 | Shimano et al. |
| 2008/0199075 A1 | 8/2008 | Gokturk et al. |
| 2010/0080450 A1* | 4/2010 | Zhao et al. ............... 382/159 |

FOREIGN PATENT DOCUMENTS

| JP | 09-006745 | 1/1997 |
| JP | 2001-184509 | 7/2001 |
| JP | 2002-259911 | 9/2002 |
| JP | 2002-304626 | 10/2002 |
| JP | 2007-018176 | 1/2007 |
| JP | 2009-211123 | 9/2009 |

OTHER PUBLICATIONS

International Search Report for International Application No. PCT/JP2009/006053 mailed on Jan. 12, 2010.
Weinberger, Kilian Q., et al.; "Distance Metric Learning for Large Margin Nearest Neighbor Classification", Advances in Neural Information Processing Systems, Cambridge, MA, 2005.

\* cited by examiner

*Primary Examiner* — Alan Chen
(74) *Attorney, Agent, or Firm* — Amin, Turocy & Watson, LLP

(57) ABSTRACT

A metric learning apparatus memorizes a learning pattern in a feature space and a category which the learning pattern belongs to, performs variable transformation of the learning pattern to a metric space by a transformation matrix, calculates a transformation matrix having a minimum loss value of a loss function in which the loss value is increased when there is a learning pattern belonging to a different category but closer than learning patterns up to $k^{th}$ closest learning pattern in an aggregate of the learning pattern belonging to the same category on the basis of the k-nearest neighbor algorithm and belonging to the same category, and determines that the metric learning is terminated and outputs the transformation matrix corresponding to the minimum loss value when the minimum loss value is at least equal to or smaller than a threshold value.

6 Claims, 4 Drawing Sheets

(a)

CONDITION $r \geq r'$

● LEARNING PATTERNS IN SAME CATEGORY

▨ ☐ LEARNING PATTERNS IN DIFFERENT CATEGORY (b)

CONDITIONS ON $r$

● LEARNING PATTERNS IN SAME CATEGORY

▨ ☐ LEARNING PATTERNS IN DIFFERENT CATEGORY

METRIC LEARNING APPARATUS

TECHNICAL FIELD

The present invention relates to a metric learning technology using a k-nearest neighbor algorithm.

BACKGROUND ART

As disclosed in Patent Documents 1 to 4 and Non-patent Document 1, a metric learning apparatus of the related art using a classification on the basis of k-nearest neighbor algorithm improves accuracy of the k-nearest neighbor classification by learning a metric in which the distance between patterns in the same category is small and the distance between patterns in different categories is large.

CITED REFERENCE

Patent Document

Patent Document 1: U.S. Unexamined Patent Application Publication No. 2008/0199075
Patent Document 2: JP-A-2002-259911
Patent Document 3: JP-A-2001-184509
Patent Document 4: JP-A-H09-006745

Non-Patent Document

Non-Patent Document 1: K. Q. Weinberger, J. Blitzer, L. K. Saul, Distance metric learning for large margin nearest neighbor classification, Advances in Neural Information Processing Systems, Cambridge, Mass., 2005.

OUTLINE OF INVENTION

Problems to be Solved by the Invention

However, since the metric learning apparatus of the related art is limited in search range when performing metric learning of a metric for the purpose of improvement of classification accuracy, improvement of the classification accuracy is hindered.

In order to solve the problem as described above, it is an object of the present invention to improve the classification accuracy.

Means for Solving the Problems

An aspect of the invention relates to a metric learning apparatus including: a memory configured to memorize a learning pattern in a feature space and a category which the learning pattern belongs to; a transforming section configured to perform variable transformation of the learning pattern to a metric space by using a predetermined transformation matrix; a transformation matrix calculating section configured to calculate, by using the learning pattern transformed by the predetermined transformation matrix, a transformation matrix which presents a minimum loss value of a loss function in which the loss value is increased when there is a learning pattern belonging to a different category but closer than to learning patterns up to $k^{th}$ closest learning pattern in an aggregate of the learning pattern belonging to the same category on the basis of the k-nearest neighbor algorithm and belonging to the same category; and a determining section configured to determine that the metric learning is terminated and outputs the transformation matrix corresponding to the minimum loss value to the outside when the minimum loss value is at least equal to or smaller than a threshold value, and output the transformation matrix corresponding to the minimum loss value to the transforming section in other cases, wherein the transforming section repeats variable transformation of the learning pattern to the metric space using the transformation matrix output from the determining section until the metric learning is terminated, and the transformation matrix transforming section repeats calculation of the transformation matrix which presents a minimum loss value of the loss function using the learning pattern transformed by the trans formation matrix output from the determining section until the metric learning is terminated.

Advantage of the Invention

According to the present invention, improvement of the classification accuracy is achieved.

MODE FOR CARRYING OUT THE INVENTION

First Embodiment

Figure 1A:
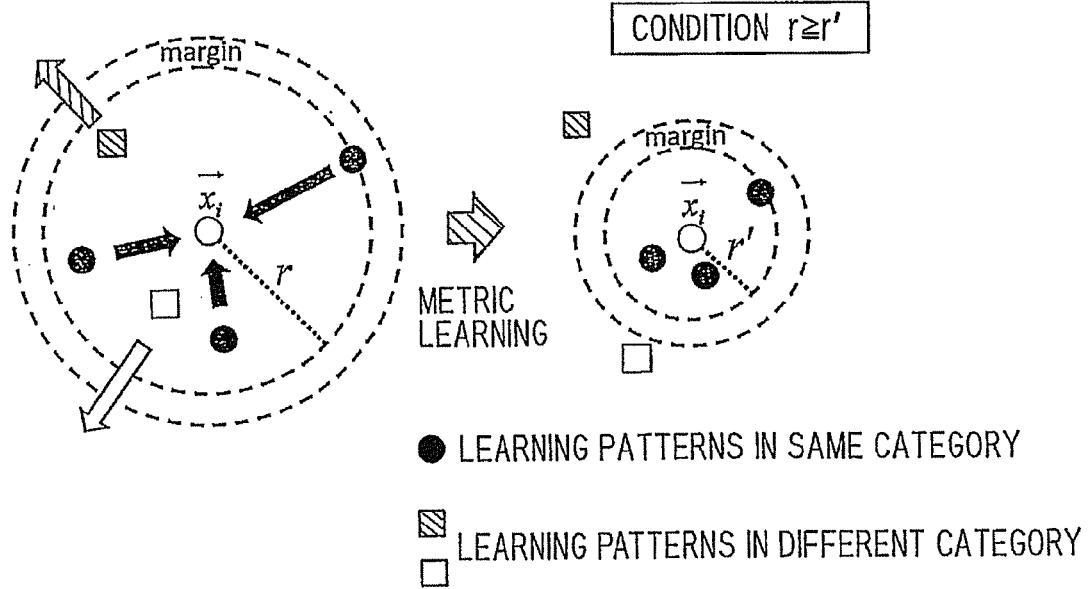
FIG. 1(a) is a drawing showing a search range in a method of the related art.
Figure 1B:
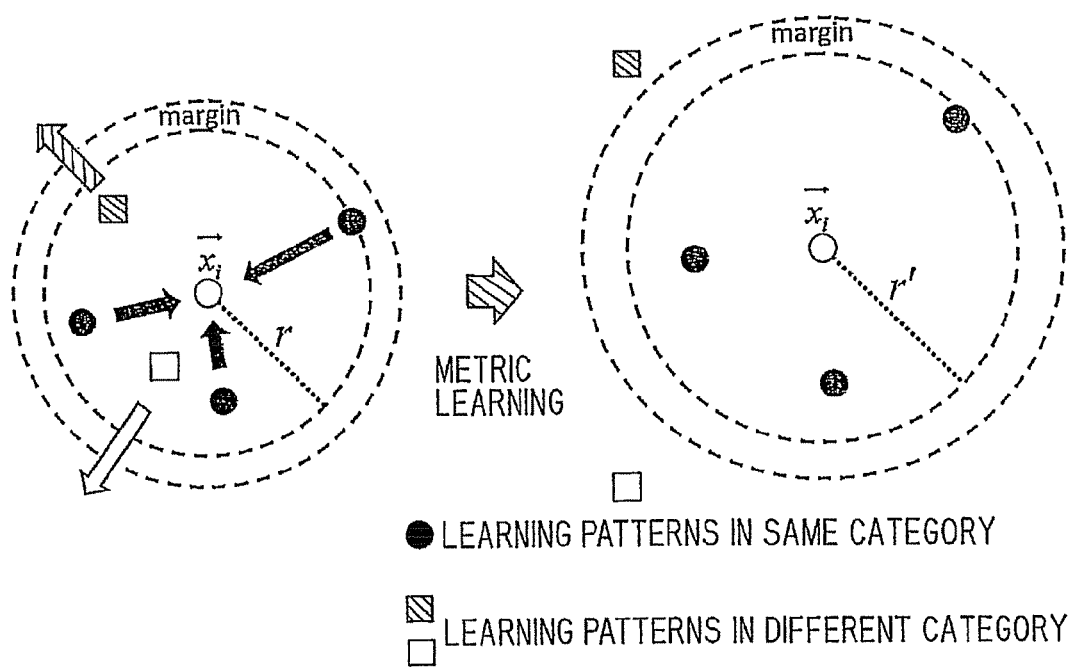
FIG. 1(b) is a drawing showing a search range according to a first embodiment.
Figure 2:
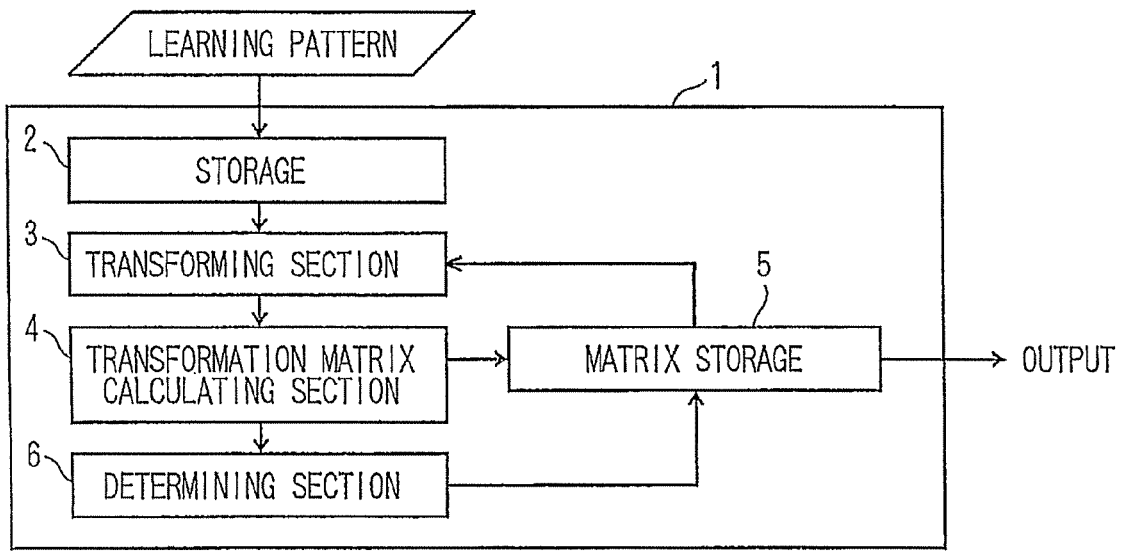
FIG. 2 is a block diagram showing a configuration of a metric space learning apparatus according to the first embodiment of the present invention.
Figure 3:
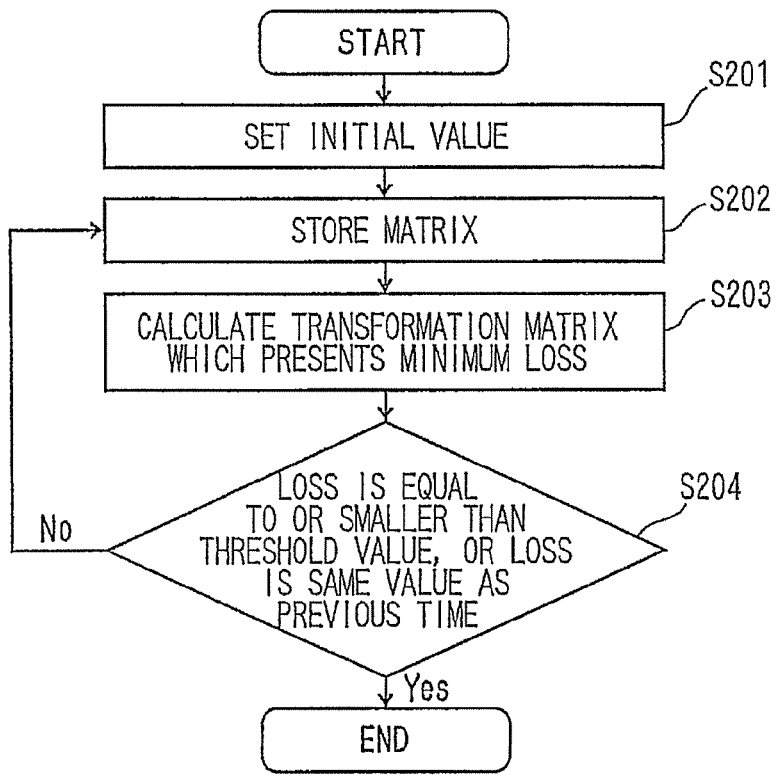
FIG. 3 is a drawing showing a flowchart of an action according to the first embodiment.

Referring now to FIG. 1 to FIG. 3, a metric learning apparatus 1 according to a first embodiment of the present invention will be described.

First of all, the theory of the first embodiment will be described in comparison with a method of the related art.

"K-nearest neighbor algorithm" is a method of classification of statistics on the basis of a nearest example of learning in a feature space, and is used in pattern recognition. The classification of a certain pattern is determined by the votes of pattern groups nearby. In other words, the most common category in k-nearest pattern groups is assigned to the corresponding pattern. The symbol "k" is a positive integer, which is generally a small integer. For example, if k=1, the corresponding pattern is simply classified in the same category as the nearest pattern.

In the method of the related art, a metric space in which learning patterns belonging to the same category get closer to each other, and learning patterns belonging to different categories separate more from each other is metrically learned. In other words, the method of the related art obtains a metric in which the distance dispersion between patterns in the same category is minimized, and the distance variance between patterns in the different categories is maximized. The term "metric learning" means to learn a distance scale suitable for classification.

The lost function $\epsilon(L)$ used for the metric learning in the method of the related art can be expressed as Expression (1) shown below as described in Patent Document 1.

[Expression 1]

$$\epsilon(L) = \sum_{ij} \eta_{ij} \times \| L(x_i - x_j) \|^2 \quad (1)$$
$$+ c \sum_{ijl} \eta_{ij} \times (1 - y_{il}) \times h(\| L(x_i - x_j) \|^2 - \| L(x_i - x_j) \|^2 + 1)$$

where, $x_i \in R_n$ (i=1, 2, ... n) is a vector aggregate of d-dimensional n learning patterns x in a feature space.

j=1, 2, ... n, i=1, 2, ... n, and the set of i, j is used for expressing the set in the same category, and the set of i, l is used for expressing the set in different categories.

$\eta_{i,j}$ is a matrix of "1" if $x_j$ is up to $k^{th}$ nearest learning pattern among those in the same category when viewed from $x_i$, and is a matrix of "0" in other cases. For reference, the symbol "k" represents an integer provided in advance in k-nearest neighbor algorithm. In other words, when $\eta_{i,j}$=1, $x_j$ and $x_i$ are k-nearest neighbors.

$y_{il}$ is a matrix which is "0" if the $x_i$ and $x_j$ are in different categories and is a matrix of "1" if $x_i$ and $x_j$ are in the same category. In other words, (1-$y_{il}$) is "1" if the $x_1$ and $x_j$ are in different categories and "0" if $x_i$ and $x_j$ are in the same category.

The symbol "c" is a normalized parameter having a positive value.

The symbol "L" is a transformation matrix to be calculated and, is a matrix of d'xd where "d'" is a dimension number of the metric space after the transformation.

$\| L(x_i - x_j) \|^2$ included in a second term of Expression (1) is a distance between learning patterns belonging to the same category in the metric space, and $\| L(x_i - x_j) \|^2$ is a distance between the learning patterns belonging to different categories in the metric space.

The constant 1 included in the second term of Expression (1) is referred to as margin, and the distance between categories after the metric learning is intended to be the margin or larger.

h(s)=max (s, 0) is a hinge loss function. Therefore, the second term in Expression (1) becomes "1" if $\| L(x_i - x_j) \|^2 - \| L(x_i - x_1) \|^2 + 1$ is "0" or larger, and becomes "0" if $\| L(x_i - x_j) |^2 - \| L(x_1 - x_j) \|^2 + 1$ is smaller than "0".

In contrast, in the classification rule in the k-nearest neighbor algorithm, the classification is determined by majority voting of categories that k learning patterns close to the input pattern belong to. Therefore, it is not necessary to reduce the distance to the learning patterns belonging to the same category as long as the distance from the learning patterns belonging to different categories is secured.

The loss function $\epsilon(L)$ of the Expression (1) in the method of the related art includes two terms. The first term of Expression (1) is an inter-category distance variance minimization term intended to explicitly reduce the distance with respect to the learning patterns belonging to the same category. Therefore, according to the classification rule of the above-described k-nearest neighbor algorithm, the first term of Expression (1) is an unnecessary term.

Also, r is assumed to be a distance to the learning patterns in a relation of k-nearest neighbor (first to $k^{th}$ nearest) in the same category as the learning pattern in the feature space before transformation and r' is assumed to be a distance thereof in the metric space after the transformation. In other words, when $\eta_{i,j}$=1, (when $x_j$ and $x_i$ are k-nearest neighbors), $r = \| (x_i - x_j) \|^2$, and $r' = \| L(x_i - x_j) \|^2$. Then, as shown in FIG. 1(a), the first term of Expression (1) in the method of the related art can only obtain the transformation matrix L which satisfies the relation r>r'. Therefore, the search in a range of r≤r' is not performed.

Therefore, in this embodiment, the limitation relating to r is eliminated by defining the loss function $\epsilon(L)$ intended only to make the variance among categories larger as Expression (2) shown below.

[Expression 2]

$$\epsilon(L) = \sum_{ijl} \eta_{ij} \times (1 - y_{ij}) \times h(\| L(x_i - x_j) \|^2 - \| L(x_i - x_j) \|^2 + 1) \quad (2)$$

Accordingly, as shown in FIG. 1(b), in this embodiment, the search range of a minimum loss value described later is enlarged to r≤r' in addition to r>r'.

Referring now to FIG. 2, a configuration of a metric learning apparatus 1 according to this embodiment will be described. FIG. 2 is a block diagram of the metric learning apparatus 1.

The metric learning apparatus 1 includes a memory 2, a transforming section 3, a transformation matrix calculating section 4, a matrix storage 5, and a determining section 6.

The memory 2 memorizes a learning pattern which is an aggregate of d-dimensional n vectors in a feature space used for the metric learning provided from the outside of the metric learning apparatus 1, and categories which the learning patterns belong to. The memory 2 sends the learning patterns and the categories belonging thereto to the transforming section 3.

The transforming section 3 performs variable transformation of the learning patterns memorized in the memory 2 to a metric space by a transformation matrix L. The transforming section 3, for the first time only, uses a unit matrix as the transformation matrix L and performs variable transformation of the learning pattern received from the memory 2 from the feature space to the metric space. From the second time onward, the transforming section 3 performs variable transformation of the learning pattern from the feature space to the metric space using the transformation matrix L which presents a minimum loss value received from the matrix storage 5. The transforming section 3 sends the learning pattern after the variable transformation to the transformation matrix calculating section 4.

The transformation matrix calculating section 4 calculates the transformation matrix L which presents a minimum value of $\epsilon(L)$ for the loss function $\epsilon(L)$ of Expression (2). When expressing Expression (2) in other words, using a learning pattern transformed by the transforming section 3 into the metric space by the transformation matrix L, the loss function $\epsilon(L)$ is a function in which the loss value is increased when there is a learning pattern belonging to a different category but closer than to a kth closest learning pattern in an aggregate of the learning pattern belonging to the same category on the basis of the k-nearest neighbor algorithm and belonging to the same category. Then, the transformation matrix calculating section 4 calculates the transformation matrix L which presents a minimum loss value by the loss function $\epsilon(L)$.

Therefore, the transformation matrix calculating section 4 calculates the transformation matrix L which presents a minimum loss value of the loss function $\epsilon(L)$ of Expression (2) by gradient method using a learning pattern transformed into the metric space. The gradient method includes a plurality of methods and any method is applicable. In this embodiment, a conjugate gradient method is used. The transformation matrix calculating section 4 sends the transformation matrix L which presents a minimum loss to the matrix storage 5 and the minimum loss value at that time to the determining section 6, respectively.

The matrix storage 5 stores a unit matrix predetermined as initial value therein as a transformation matrix L, and from then onward, stores the transformation matrixes L calculated by the transformation matrix calculating section 4. The matrix storage 5 sends the unit matrix as an initial value or a transformation matrix L with a minimum loss value calculated by the transformation matrix calculating section 4 to the transforming section 3 if the metric learning is not terminated on the basis of the determination by the determining section 6, and outputs the transformation matrix L with the minimum loss value calculated by the transformation matrix calculating section 4 to an outside of the metric learning apparatus 1 (for example to a discriminating section 603 in a fourth embodiment) if the metric learning is terminated on the basis of the determination by the determining section 6.

The determining section 6 determines whether or not the metric learning is to be terminated from the minimum loss value calculated by the transformation matrix calculating section 4. In other words, the determining section 6 terminates the metric learning when the minimum loss value received from the transformation matrix calculating section 4 is equal to or smaller than the threshold value, or when the loss value is the same as the previous minimum loss value, and determines to continue the metric learning in other cases. The determining section 6 sends the result of determination to the matrix storage 5.

The operation of the metric learning apparatus 1 will be described with reference to FIG. 3. FIG. 3 is a flowchart showing the operation of the metric learning apparatus 1.

In Step S201, the transforming section 3 sets a unit matrix as an initial value for the metric learning, and the procedure goes to Step S202.

In Step S202, the determining section 6 stores the given transformation matrix L, and the procedure goes to Step S203.

In Step S203, the transformation matrix calculating section 4 calculates the transformation matrix L which presents a minimum loss value, and the procedure goes to Step S204.

In Step S204, the determining section 6 terminates the process when the minimum loss value calculated by the transformation matrix calculating section 4 is equal to or smaller than the threshold, or when the minimum loss value is the same as the previous loss value (when Yes), and the procedure goes back to Step S202 in other cases (when No).

According to the embodiment, the limitation of the search range is eliminated by considering only the distance variance between patterns in the different category without considering the distance variance between patterns in the same category in the metric learning, and the classification accuracy in the obtained metric is improved.

Second Embodiment

Figure 4:
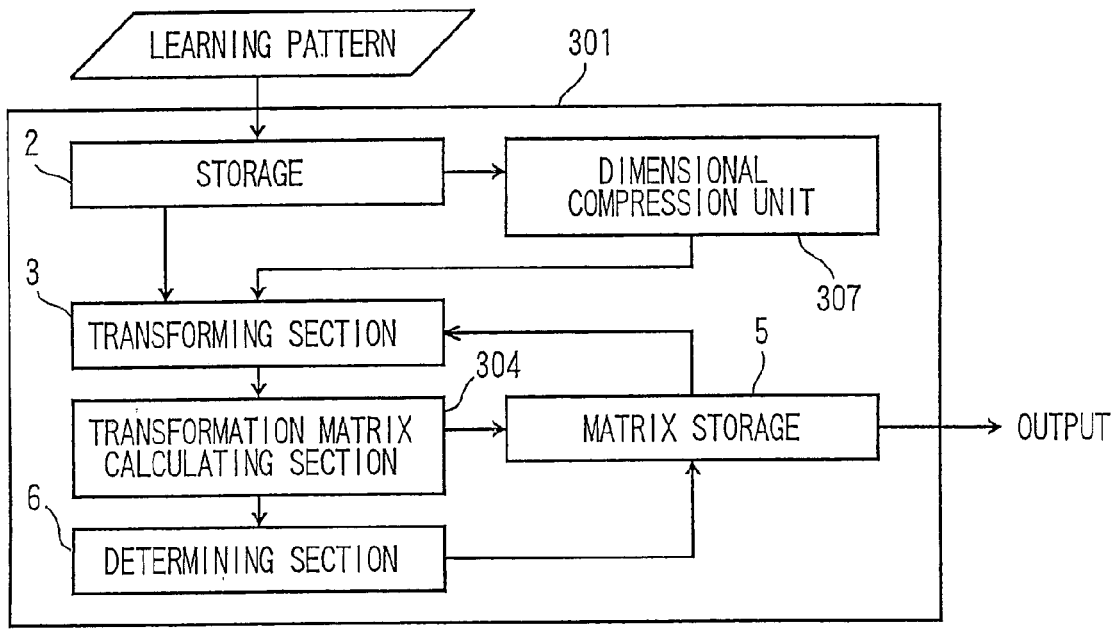
FIG. 4 is a block diagram showing a configuration of the metric space learning apparatus according to a third embodiment.
Figure 5:
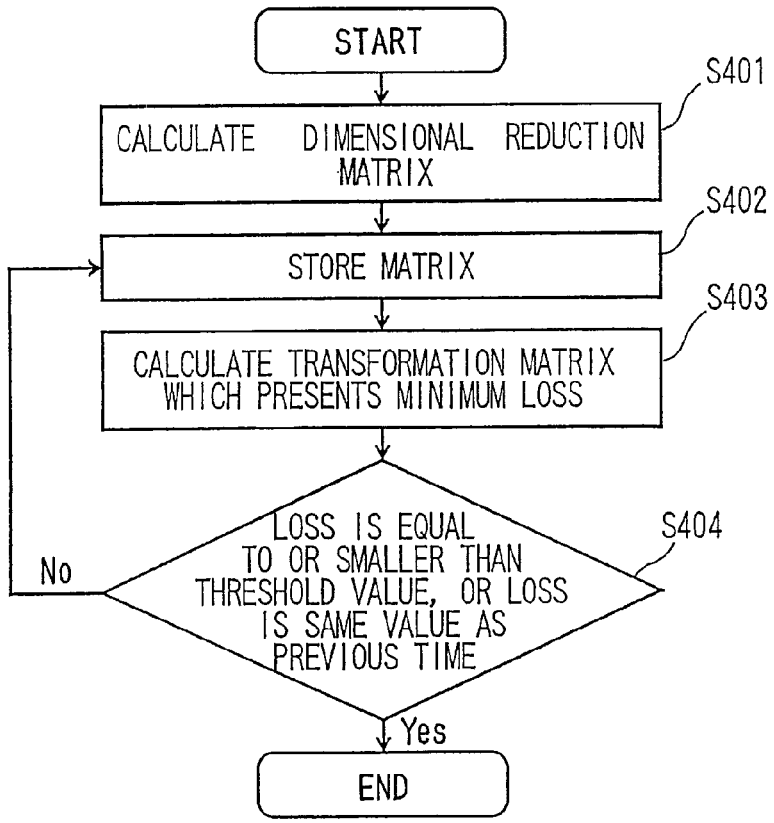
FIG. 5 is a drawing showing a flowchart of an action according to the third embodiment.

Referring now to FIG. 4 to FIG. 5, the metric learning apparatus 1 according to a second embodiment of the present invention will be described.

With Expression (3) shown below in which a norm (for example, Frobenius norm) is added to the loss function $\epsilon(L)$ of Expression (2) described above, a transformation matrix L which reduces the scale of metric space after the transformation is obtained. Accordingly, "1" of margin is relatively increased, so that an effect of maximization of the margin is achieved, whereby improvement of the classification accuracy is achieved.

[Expression 3]

$$\epsilon(L) = \sum_{ijl} \eta_{ij} \times (1-y_{ij}) \times h(\|L(x_i - x_j)\|^2 - \|L(x_i - x_j)\|^2 + 1) + \|L\| \quad (8)$$

$$\|L\| = \sum_{i=1}^{m} \sum_{j=1}^{n} |L_{ij}|^2$$

Accordingly, the transformation matrix calculating section 4 in this embodiment uses the loss function $\epsilon(L)$ defined by Expression (3) and obtains a transformation matrix L which presents a minimum loss value by the gradient method in the same manner as in the first embodiment.

The operations of the memory 2, the transforming section 3, the matrix storage 5, and the determining section 6 are the same as in the first embodiment.

Third Embodiment

Referring now to FIG. 4 to FIG. 5, a metric learning apparatus 301 according to a third embodiment of the present invention will be described.

The configuration of the metric learning apparatus 301 will be described with reference to FIG. 4. FIG. 4 is a block diagram of the metric learning apparatus 301.

The metric learning apparatus 1 includes the memory 2, the transforming section 3, a transformation matrix calculating section 304, the matrix storage 5, the determining section 6, and a dimensional reduction section 307. In the following description, description of the same configurations of the metric learning apparatus 301 as those of the metric learning apparatus 1 in the first embodiment will be omitted.

The dimensional reduction section 307 calculates the transformation matrix to lower-dimensional subspace as an initial value of the transformation matrix L calculated by the transformation matrix calculating section 304. More specifically, the dimensional reduction section 307 performs an analysis of principal component for the learning pattern received from the memory 2, selects eigenvectors by the same number as the dimension number of the metric space after transformation (dimension number in the subspace) of the metric space after the transformation in descending order of the obtained eigenvalues, thereby obtaining the dimensional reduction matrix. The dimensional reduction section 307 sends the calculated dimensional reduction matrix to the transforming section 3.

The memory 2 sends the learning pattern and the category it belongs to also to the dimensional reduction section 307.

The transforming section 3, performs variable transformation of the learning pattern received from the memory 2 using the dimensional reduction matrix received from the dimensional reduction section 307 as the transformation matrix L for the first time only. In other words, the transforming section 3 performs the dimensional reduction of the learning pattern to a metric space having a dimension number not larger than that of the original feature space by using the dimensional reduction matrix. From the second time onward, the same operation as the first embodiment is performed.

The transformation matrix calculating section 304 uses loss function $\epsilon(L)$ defined by Expression (2) or Expression (3) and obtains the transformation matrix which presents a minimum loss value by the gradient method in the same manner as the transformation matrix calculating section 4 in the first embodiment.

The operation of the metric learning apparatus 301 will be described with reference to FIG. 5. FIG. 5 is a flowchart showing the operation of the metric learning apparatus 301.

As Steps S402 to S404 in the operation of the metric learning apparatus 301 are the same as Steps S202 to S204 in FIG. 3, the description will be omitted.

In Step S401, the dimensional reduction section 307 calculates a dimensional reduction matrix with respect to the learning pattern, and the procedure goes to Step S402.

Fourth Embodiment

A metric learning apparatus 501 according to a fourth embodiment of the present invention will be described below.

The configuration of the metric learning apparatus 501 will be described with reference to FIG. 4. The metric learning apparatus 501 has the same configuration as the metric learning apparatus 301 in the second embodiment. However, this embodiment is different from the second embodiment in that Expression (2) is used instead of Expression (3) and the transformation matrix L obtained by the metric learning is not a linear shape but a non-linear shape.

Hereinafter, description of a state when the loss function $\epsilon(L)$ is expanded from a linear shape to a non-linear shape.

The object function (loss function) when performing the metric learning is shown in Expression (2), and when solving this expression by a gradient method, differentiation is achieved as shown in Expression (4).

[Expression 4]

$$\frac{\partial \varepsilon(L)}{\partial L} = \\ 2L \sum_{ijl} \eta_{ij} \times (1 - y_{ij}) \times [(x_i - x_j)(x_i - x_j)^T - (x_i - x_j)(x_i - x_j)^T] \times \\ h'(\|L(x_i - x_j)\|^2 - \|L(x_i - x_j)\|^2 + 1) \quad (4)$$

However, h'(s) is a function which is obtained by differentiating the hinge loss function, h(s).

The expansion of the transformation matrix L to a non-linear shape is achieved by using Kernel function. The term "Kernel function" means an inner product in a super high-dimensional feature space when an input space a is mapped to the super high-dimensional feature space φ(a) by non-linear transformation φ. In general, flexibility of transformation is increased and hence improvement of the classification accuracy is achieved by being transformed into non-linear shape in comparison with the linear transformation. In this embodiment, Gaussian Kernel is used.

In this embodiment the non-linear transformation is achieved by changing the transformation matrix L into Expression (5) shown below.

[Expression 5]

$$L = \Omega \Phi \; \Phi^T = [(\phi(x_1), \phi(x_2), \ldots] \quad (5)$$

When Expression (5) is applied to Expression (4), the gradient becomes as Expression (6).

[Expression 6]

$$\frac{\partial \varepsilon(L)}{\partial L} = 2\Omega \sum_{ijl} \eta_{ij} \times (1 - y_{ij}) \times \\ [(k_i - k_j)(\phi(x_i) - \phi(x_j))^T - (k_i - k_j)(\phi(x_i) - \phi(x_j))^T] \times \\ h'(\|L(\phi(x_i) - \phi(x_j))\|^2 - \|L(\phi(x_i) - \phi(x_j))\|^2 + 1) \quad (6)$$

where $k_i = \Phi\phi(i) = [k(x_1, x_i), \ldots k(x_n, x_i)]^T$, $k(x_i, x_j) = \phi(i)^T \phi(j)$ Furthermore, when Expression (6) is transformed, Expression (7) is obtained.

[Expression 7]

$$\frac{\partial \varepsilon(L)}{\partial L} = \\ 2\Omega \sum_{ijl} \eta_{ij} \times (1 - y_{ij}) \times \left[ E_i^{(k_1 - k_j)} - E_j^{(k_i - k_j)} - E_l^{(k_i - k_j)} - E_l^{(k_i - k_j)} \right] \times \\ h'(\|L(\phi(x_i) - \phi(x_j))\|^2 - \|L(\phi(x_i) - \phi(x_i))\|^2 + 1) \quad (7)$$

where, $E_i^v = [0, \ldots, v, 0, \ldots 0]$ is a matrix of n×n, and has a v vector only in an $i^{th}$ row and has a 0 vectors in other rows.

The transformation matrix L is renewed by the gradient obtained by Expression (7), and Expression (2) as an object function is minimized, so that improvement of the classification accuracy is achieved.

Fifth Embodiment

A metric learning apparatus 601 according to a fifth embodiment of the present invention will be described below.

The metric learning apparatus 601 has the same configuration as the metric learning apparatus 501 in the fourth embodiment, and the transformation matrix L obtained by the metric learning has a non-linear shape. However, this embodiment is different from the fourth embodiment in that Expression (3) is used instead of Expression (2).

Hereinafter, description of a state when the loss function $\epsilon(L)$ is expanded from a linear shape to a non-linear shape.

The differentiation of the loss function $\epsilon(L)$ defined by Expression (3) can be expanded substantially in the same manner as the expansion shown relating to Expansion (2).

The differentiation of the norm of the transformation matrix L can be expressed by Expression (8) shown below, and the differentiation of Expression (3) is also enabled by adding Expression (8) to Expression (2).

[Expression 8]

$$\frac{\partial \|L\|}{\partial L} = 2L \quad (8)$$

Sixth Embodiment

Figure 6:
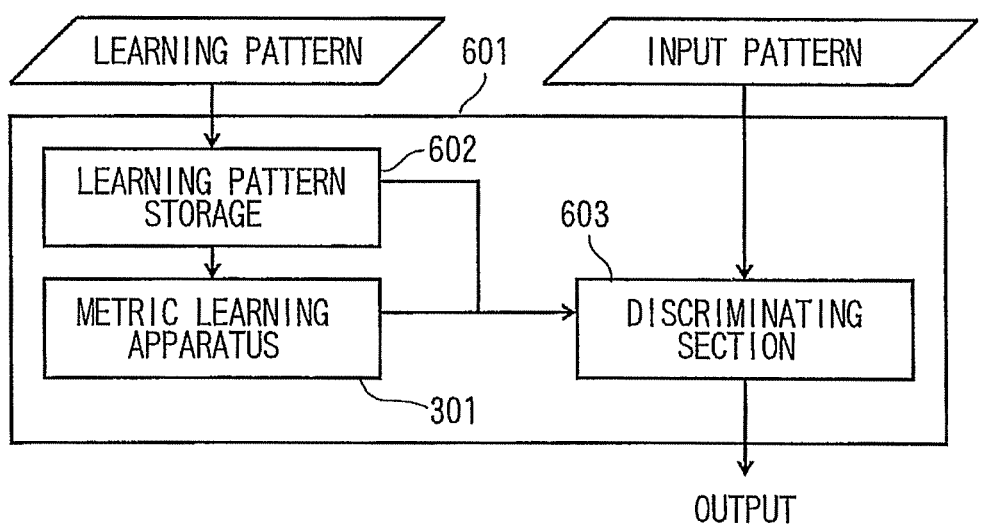
FIG. 6 is a block diagram showing a configuration of a pattern recognizing apparatus according to a sixth embodiment.

Referring now to FIG. 6, a sixth embodiment of the present invention will be described below.

In this embodiment, the pattern recognizing apparatus 601 including the metric space learning apparatus 301 will be described. The pattern recognizing apparatus 601 may be applied to, for example, object recognition (for example, facial recognition) appeared in an image or data mining.

The configuration of the pattern recognizing apparatus 601 will be described with reference to FIG. 6. FIG. 6 is a block diagram of the pattern recognizing apparatus 601.

The pattern recognizing apparatus 601 includes the metric learning apparatus 301 in the second embodiment, a learning pattern memory 602 configured to memorize input learning patterns and categories, and a classifying section 603 configured to constitutes an classifier from the learning pattern and categories memorized in the learning pattern memory 602 and the transformation matrix learned by the metric space learning apparatus 301, and discriminate the input pattern.

The learning pattern memory 602 memorizes the input learning pattern and the category. The learning pattern memory 602 sends the learning patterns and the categories to the memory 2 of the metric space learning apparatus 301 and the discriminating section 603.

The metric space learning apparatus 301 performs the metric learning from the learning pattern and the category received by the learning pattern memory 602 as described in the second embodiment, and outputs the transformation matrix L which presents a minimum loss value obtained by the metric learning to the discriminating section 603.

The classifying section 603 constitutes a classifier and classifies a category of an input pattern whose category is unknown.

First of all, the classifying section 603 receives the learning pattern and the category from the learning pattern memory 602, and receives the transformation matrix L obtained by the metric learning from the metric learning apparatus 301. As disclosed in JP-A-2009-20769, the classifier applies variable transformation to the learning pattern by the transformation matrix L obtained by the metric learning at the time of learning, and obtains a hash function which makes the number of patterns belonging to one bin on the respective dimension vectors equal.

Subsequently, the classifier performs variable transformation of the input pattern by the transformation matrix L at the time of classification, and obtains the hash values in the respective dimensions by the hash function obtained at the time of learning. Then, the classifier sorts the learning patterns having the same hash value by the total number of the learning patterns, searches the learning pattern only from the top, and obtains the category which the searched learning pattern belongs to by majority voting. Finally, the classifier outputs the category obtained as a result of the majority voting as a category of the input pattern.

According to this embodiment, the classification accuracy is improved by using the transformation matrix L in an optimal metric.

For reference, although the metric learning apparatus 301 in the third embodiment is employed in the embodiment described above, the metric learning apparatus of other embodiments may be employed.

(Modification)

The metric learning apparatuses according to the receptive embodiments may be realized by using the general-purpose computers as basic hardware. In other words, the transforming section, the transformation matrix calculating section, and the determining section may be realized by causing a processor mounted on the computer to execute a program. At this time, the metric space learning apparatus may be realized by installing the above-described program in computers in advance, or may be realized by distributing the above-described program by storing the program in a recording medium such as a CD-ROM or via a network to allow the program to be installed in computers as needed.

The invention is not limited to the embodiments shown above as is, and components may be modified and embodied without departing from the scope of the invention in the stage of implementation. Various modes of the invention are achieved by combining the plurality of components disclosed in the embodiments described above as needed. For example, several components may be eliminated from all the components shown in the embodiment. In addition, the components in different embodiments may be combined as needed.

DESCRIPTION OF REFERENCE NUMERALS AND SIGNS

1 . . . metric learning apparatus, 2 . . . memory, 3 . . . transforming section, 4 . . . transformation matrix calculating section, 5 . . . matrix storage, 6 . . . determining section

The invention claimed is:

1. A metric learning apparatus comprising:
a memory configured to memorize a learning pattern in a feature space and a category which the learning pattern belongs to;
a transforming section configured to perform variable transformation of the learning pattern to a metric space by using a predetermined transformation matrix;
a transformation matrix calculating section configured to calculate a transformation matrix which presents a minimum loss value of a loss function in which the loss value is increased when there is a learning pattern belonging to a different category but closer than to learning patterns up to $k^{th}$ closest learning pattern in an aggregate of the learning pattern belonging to the same category on the basis of the k-nearest neighbor algorithm and belonging to the same category; and
a determining section configured to determine that the metric learning is terminated and outputs the transformation matrix corresponding to the minimum loss value to the outside when the minimum loss value is at least equal to or smaller than a threshold value, and output the transformation matrix corresponding to the minimum loss value to the transforming section in other cases,
wherein the transforming section repeats variable transformation of the learning pattern to the metric space using the transformation matrix output from the determining section until the metric learning is terminated, and
the transformation matrix transforming section repeats calculation of the transformation matrix which presents a minimum loss value of the loss function using the learning pattern transformed by the transformation matrix output from the determining section until the metric learning is terminated.

2. The metric learning apparatus according to claim 1, wherein the transformation matrix calculating section enlarge a search range for searching the minimum loss value to where r is a distance to the $k^{th}$ nearest learning pattern in the aggregate of the learning patterns belonging to the same category in the feature space, and r' is a distance to the $k^{th}$ nearest learning pattern in the metric space after transformation.

3. The metric learning apparatus according to claim 2, wherein the transformation matrix calculating section adds a value of norm of the transformation matrix to the loss value of the loss function, and calculates using the added value as a loss value instead of the loss value before addition.

4. The metric learning apparatus according to claim 3, wherein the transformation matrix calculating section uses a unit matrix or a dimensional reduction matrix configured to transform to a lower dimensional space as the predetermined transformation matrix.

5. The metric learning apparatus according to claim 4, comprising a dimensional reduction section configured to perform an analysis of principal component on the learning pattern in the feature space and calculate the dimensional reduction matrix by reducing to a lower dimensional space.

6. The metric learning apparatus according to claim 5, wherein the transformation matrix has a linear shape or a non-linear shape.

* * * * *